United States Patent
Zhao et al.

(10) Patent No.: US 11,927,485 B2
(45) Date of Patent: Mar. 12, 2024

(54) SYSTEMS, METHODS, AND COMPUTER PROGRAM PRODUCTS FOR DETECTION LIMIT DETERMINATIONS FOR HYPERSPECTRAL IMAGING

(71) Applicant: Rebellion Photonics, Inc., Houston, TX (US)

(72) Inventors: Chuan Zhao, Sugar Land, TX (US); Patrick Charles O'Driscoll, Houston, TX (US); Reza Katebi, Decatur, GA (US); Amirhossein Rafati, Atlanta, GA (US)

(73) Assignee: Rebellion Photonics, Inc., Houston, TX (US)

( * ) Notice: Subject to any disclaimer, the term of this patent is extended or adjusted under 35 U.S.C. 154(b) by 20 days.

(21) Appl. No.: 17/645,021

(22) Filed: Dec. 17, 2021

(65) Prior Publication Data
US 2023/0194349 A1    Jun. 22, 2023

(51) Int. Cl.
*G01J 5/00*    (2022.01)
*G01J 5/52*    (2022.01)
*H04N 23/11*   (2023.01)

(52) U.S. Cl.
CPC ............ *G01J 5/0014* (2013.01); *G01J 5/52* (2013.01); *H04N 23/11* (2023.01); *G01J 2005/0077* (2013.01)

(58) Field of Classification Search
CPC .... G01J 5/0014; G01J 5/52; G01J 2005/0077; H04N 23/11
See application file for complete search history.

(56) References Cited

U.S. PATENT DOCUMENTS

| 8,611,586 | B1 * | 12/2013 | Brodeur ............... G06V 40/103 382/168 |
| 8,755,597 | B1 * | 6/2014 | Tantalo ..................... G06T 5/50 382/284 |

(Continued)

FOREIGN PATENT DOCUMENTS

WO    2015/166265 A1    11/2015

OTHER PUBLICATIONS

European search report dated Apr. 20, 2023 for EP Application No. 22207195, 9 page(s).

*Primary Examiner* — David P Porta
*Assistant Examiner* — Gisselle M Gutierrez
(74) *Attorney, Agent, or Firm* — Alston & Bird LLP (57) ABSTRACT

Systems, methods, and computer program products for thermal contrast determinations are provided. An example imaging system includes a first infrared (IR) imaging device that generates first IR image data of a field of view of the first IR imaging device and a computing device connected with the first IR imaging device. The computing device receives probe temperature data from a temperature probe indicative of an external environment of the imaging system and receives the first IR image data from the first IR imaging device. The computing device determines background temperature data based upon the first IR image data, determines gas temperature data based upon the probe temperature data, and determines a thermal contrast for each pixel based upon a comparison between the background temperature data and the gas temperature data. The computing device further determines a detection limit for each pixel as a function of thermal contrast.

20 Claims, 6 Drawing Sheets

(56) References Cited

U.S. PATENT DOCUMENTS

| | | | |
|---|---|---|---|
| 9,726,543 B2* | 8/2017 | Zeng | G06T 7/0004 |
| 10,684,216 B2 | 6/2020 | Wang | |
| 2016/0238451 A1* | 8/2016 | Zeng | G01J 5/06 |
| 2019/0339159 A1* | 11/2019 | Israelsen | G01M 3/38 |
| 2019/0340914 A1* | 11/2019 | Israelsen | G01M 3/04 |
| 2020/0309683 A1 | 10/2020 | Imade | |

* cited by examiner

SYSTEMS, METHODS, AND COMPUTER PROGRAM PRODUCTS FOR DETECTION LIMIT DETERMINATIONS FOR HYPERSPECTRAL IMAGING

TECHNOLOGICAL FIELD

Example embodiments of the present disclosure relate generally to imaging systems and, more particularly, to hyperspectral and/or infrared (IR) imaging to detect and quantify gas leakages.

BACKGROUND

In many environments, such as manufacturing facilities, drilling locations, pipelines, and/or the like, gases may be used, stored, transferred, moved, etc. For example, a natural gas pipeline may transport natural gas (e.g., methane and/or the like) between locations. During transport, some gas may be emitted from such an example pipeline, such as due to a leak in the pipeline system (e.g., due to poor sealing at pipe junctions, an impact with the pipeline, etc.). In order to identify a leak and/or quantify the amount of gas emitted (e.g., a fugitive emission) from the leak, hyperspectral cameras may be used. The inventors have identified numerous deficiencies with the existing technologies in this field, the remedies for which are the subject of the embodiments described herein.

BRIEF SUMMARY

As described above, many industries and environments rely upon or otherwise leverage gases in performing various operations associated with these industries. For example, the natural gas industry may extract, transport, and process natural gas (e.g., methane and/or the like) for subsequent use in generating heat, generating electricity, fueling vehicles, etc. The emittance of this gas to an external environment, such as due to a leak in one or more systems, may result in large costs in lost product as well as the potential for large fines from, for example, governmental regulatory agencies. Furthermore, the leakage of gases such as methane may present a dangerous condition to workers or otherwise impact workplace safety. As such, the accurate detection and quantification of gas leakages (e.g., a leaking plume of gas) is of critical importance in order to maximize profit while preventing hazardous conditions.

In infrared, hyperspectral, and/or thermal imaging applications used to detect or quantify gas leaks, the temperature associated with a particular location within the image (e.g., represented by one or more pixels) may account for the temperature of any location, object, fluid, gas, etc. present or otherwise associated with this pixel. Said differently, temperature values or data associated with a particular pixel are influenced by the temperature at each location along a line extending from the imaging device to the limit of the device's resolution. An infrared (IR) imaging device or camera may determine a temperature for a particular pixel that is influenced by, for example, a leaking gas captured by the camera and associated with the particular pixel as well as the temperature of the foreground/background of the pixel. As such, the temperature of an example background may operate to influence the ability of the camera to properly quantify the presence or amount of gas at a particular location. Traditional systems that attempt to detect and/or quantify gas leaks fail to properly account for a potential thermal contrast (e.g., a temperature difference between the detected gas and the background) and/or fail to properly provide to the user a representation of the detection limitations of the system based upon such a thermal contrast.

To solve these issues and others, example implementations of embodiments of the present disclosure may leverage infrared (IR) imaging devices, such as those implemented in a hyperspectral camera implementation, as well as distinct temperature probes (e.g., thermometers, thermistors, temperature sensors, etc.) so as to gather data indicative of the temperature of a potential gas leak as well as the temperature associated the image's background. For example and in the absence of a gas leak within the FOV of an example IR imaging device, probe temperature data may be used to determine a gas temperature by associating the tendency of the temperature of a gas leak to, within applicable time limitations, reach (e.g., match) the temperature of an external environment. In the absence of a gas leak, the IR image data may be used to determine or generate background temperature data and the computing devices described herein may operate to generate a thermal contrast and an example detection limit based upon a comparison between the gas temperature data and the background temperature data. A detection limit map with respective visual identifiers may also be used to illustrate the detection limit for particular pixels for further review by a user. In doing so, the embodiments of the present disclosure may account for the evolving environmental or ambient conditions proximate a gas leak (e.g., fugitive emission) so as to accurately ascertain and quantify the thermal detection capabilities of an example imaging system (e.g., IR camera, hyperspectral camera, etc.)

Apparatuses, methods, systems, devices, and associated computer program products are provided for detection limit determinations. An example imaging system may include a first infrared (IR) imaging device configured to generate first IR image data of a field of view of the first IR imaging device and a computing device operably connected with the first IR imaging device. The computing device may be configured to receive probe temperature data from a temperature probe communicably coupled with the computing device where the probe temperature data may be indicative of an external environment of the imaging system and may receive the first IR image data from the first IR imaging device. The computing device may further determine background temperature data based upon the first IR image data where the background temperature data includes a first temperature for each pixel from amongst a plurality of pixels associated with the first IR image data. The computing device may further determine gas temperature data based upon the probe temperature data where the gas temperature data includes a second temperature for each pixel from amongst the plurality of pixels associated with the first IR image data and may determine a thermal contrast for each pixel based upon a comparison between the background temperature data and the gas temperature data. The computing device may be further configured to determine a detection limit for each pixel as a function of the thermal contrast for each pixel.

In some embodiments, the temperature probe may be positioned within the field of view of the first IR imaging device.

In some embodiments, the imaging system includes the temperature probe and the temperature probe may be attached to a housing supporting the first IR imaging device.

In some embodiments, the imaging system may include a second IR imaging device configured to generate second IR image data of a field of view of the second IR imaging device and operably connected with the computing device. In such an embodiment, the computing device may be further configured to determine the background temperature data based upon the second IR image data.

In some embodiments, the computing device may be further configured to compare the detection limit for each pixel with a limit threshold. In an instance in which the detection limit satisfies the limit threshold, the computing device may assign a first visual identifier to the respective pixel. In an instance in which the detection limit fails to satisfy the limit threshold, the computing device may assign a second visual identifier to the respective pixel.

In some further embodiments, the computing device may be configured to render a detection limit map including a visual representation for each pixel based upon the visual identifier assigned to the respective pixel.

In some still further embodiments, the computing device may be configured to modify the detection limit map in response to iterative determinations of the thermal contrast and associated detection limit determinations.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a computing device of an example imaging system as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "first IR imaging device" or "first IR imager" refer to a device or devices capable of generating first IR image data. Example first IR imaging devices may include a thermal imaging camera, an IR imager, an IR camera, a thermographic camera, and/or the like that may generate IR image data indicative of a field of view (FOV) of the first IR imaging device. Said differently, the first IR imaging device may include any device, apparatus, system, etc. capable of detecting infrared energy/radiation and converting said infrared energy/radiation into a corresponding electronic signal (e.g., first IR image data). By way of a non-limiting example, the first IR imaging device may include an IR camera configured to capture IR energy emitted by a fugitive emission from an example emission source as described hereafter located within a first FOV associated with the first IR imaging device. The first IR imaging device may also be associated with a first filter that defines a first band-pass frequency (e.g., a device that passes frequencies within a certain range and attenuates frequencies outside this range). As described hereafter, this first filter may be configured to pass IR radiation having a frequency associated with the fugitive emission (e.g., gas) for which the imaging device is design to monitor (e.g., methane or the like) to the first IR imaging device.

As used herein, the terms "second IR imaging device" or "second IR imager" refer to a device or devices capable of generating second IR image data. Example second IR imaging devices may also include a thermal imaging camera, an IR imager, an IR camera, a thermographic camera, and/or the like that may generate IR image data indicative of a field of view (FOV) of the second IR imaging device. Said differently, the second IR imaging device may include any device, apparatus, system, etc. capable of detecting infrared energy/radiation and converting said infrared energy/radiation into a corresponding electronic signal (e.g., second IR image data). By way of a non-limiting example, the second IR imaging device may also include an IR camera configured to capture IR energy emitted by a fugitive emission from an example emission source as described hereafter located within a second FOV associated with the second IR imaging device. The second IR imaging device may also be associated with a second filter that defines a second band-pass frequency (e.g., a device that passes frequencies within a certain range and attenuates frequencies outside this range). As described hereafter, this second filter may be configured to pass IR radiation having a frequency associated with the fugitive emission (e.g., gas) for which the imaging device is design to monitor (e.g., methane or the like) to the second IR imaging device and may further be configured for use with the same frequency as the first filter. Although described herein with refence to two (2) IR imaging devices, the present disclosure contemplates that the imaging system may include any number of IR imaging devices based upon the intended application of the imaging system.

As used herein, the term "computing device" refers to any user device, controller, object, or system which may be in physical or network communication with a first IR imaging device, a second IR imaging device, and/or a temperature probe as described hereafter. For example, the computing device may refer to a wireless electronic device configured to perform various IR image related operations in response to first IR image data and/or second IR image data generated by the first IR imaging device and the second IR imaging device, respectively. The computing device may be configured to communicate with the first IR imaging device and/or the second IR imaging device via Bluetooth, NFC, Wi-Fi, 3G, 4G, 5G protocols, and the like. In some instances, the computing device may comprise the first IR imaging device and/or the second IR imaging device (e.g., an integrated configuration).

As used herein, the terms "fugitive emission," "gas leak," "gas plume," and/or "gas leak plume" may refer to a collection of gas atoms or particles that include vast separation between individual atoms or particles. Such a gas may leak or otherwise be emitted from a containing vessel (e.g., natural gas pipeline or the like) or an emission source and may be formed as a plume or column. This plume may be a vertical body of a first fluid (e.g., the leaking gas) moving relative or through another second fluid (e.g., the ambient air). As would be evident in light of the present disclosure, the intensity of the gas may dissipate as the distance between the leaking gas and the source of the leak increases. For example, a gas leak from a pipeline that contains methane gas may result in a gas plume of methane gas emitted from the pipeline such that the intensity (e.g., concentration) of methane gas decreases as the distance between the particles of methane gas and the location of the leakage increases. Although described herein with reference to an example methane gas application, the present disclosure contemplates that the imaging system(s) described herein may be configured for use with gas of any type, concentration, etc. Furthermore and as described hereafter, the temperature of a gas leak may, within applicable time limitations, reach or otherwise match the temperature of an external environment.

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

Figure 1:
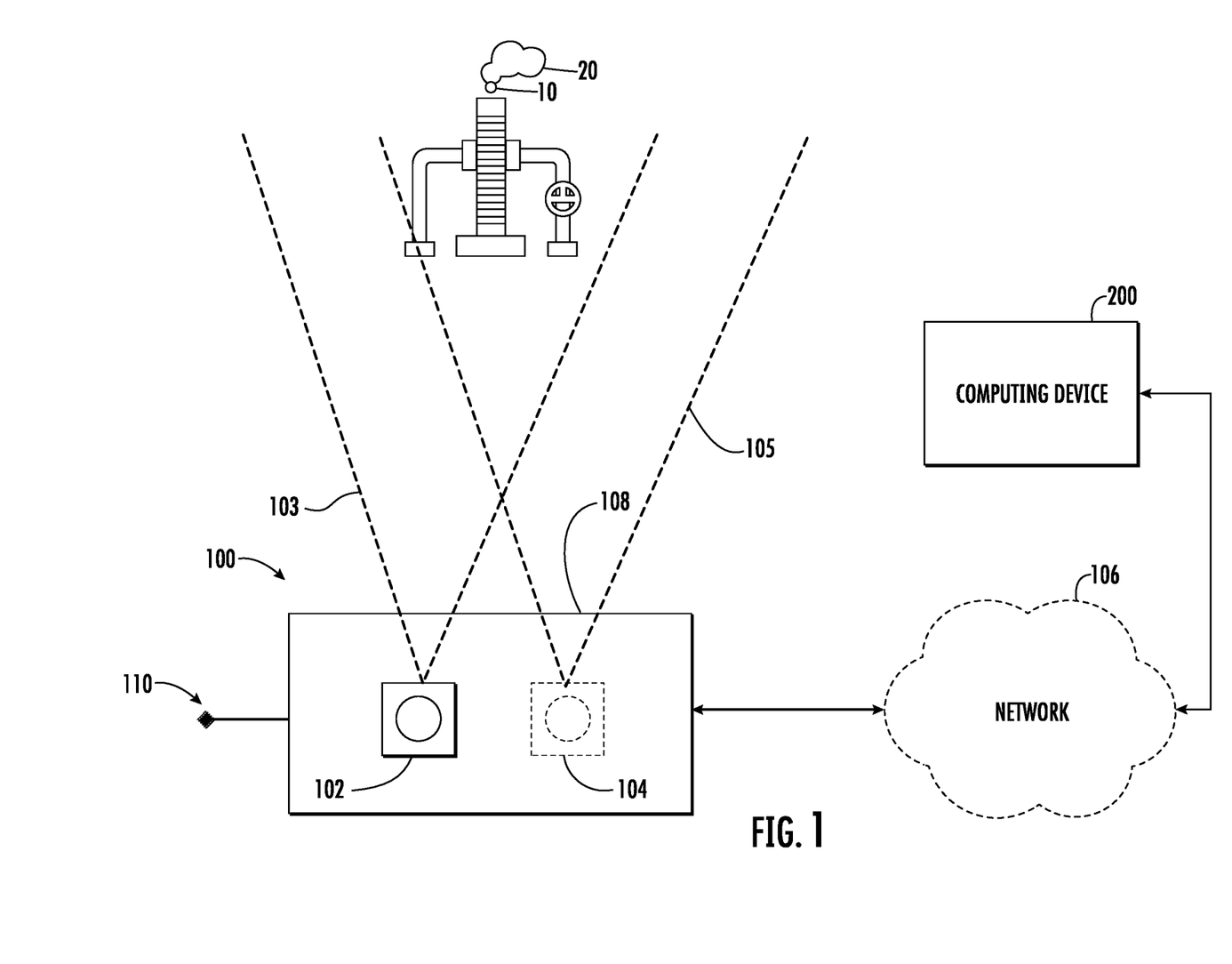
FIG. 1 illustrates an example imaging system in operation with emission sources, in accordance with some example embodiments described herein.

With reference to FIG. 1, an example imaging system 100 is illustrated with a first IR imaging device 102 and a second IR imaging device 104 operably coupled with a computing device 200 via a network 106. As defined above, the first IR imaging device 102 may comprise a device capable of generating first IR image data and may be a thermal imaging camera, an IR imager, an IR camera, a thermographic camera, and/or the like. The first IR imaging device 102 may be associated with a FOV 103. The FOV 103 may refer to the observable area within which the first IR imaging device 102 may capture images (e.g., generate first IR image data). As described hereafter, in some embodiments, the first IR imaging device 102 may be positioned or oriented such that an emission source 10 is physically located within the FOV 103 of the first IR imaging device 102. Said differently, the FOV 103 of the first IR imaging device 102 may be such that first IR image data generated by the first IR imaging device 102 (e.g., captured IR images of the FOV 103) may include IR image data indicative of or otherwise associated with the emission source 10. The present disclosure contemplates that the first IR imaging device 102 may be positioned at any physical location and at any orientation based upon the intended application of the system 100. Furthermore, the present disclosure contemplates that the FOV 103 may be varied based upon the operating parameters of the first IR imaging device 102.

In some embodiments, the imaging system 100 may include a second IR imaging device 104 that may comprise a device capable of generating second IR image data and may be a thermal imaging camera, an IR imager, an IR camera, a thermographic camera, and/or the like. The second IR imaging device 104 may be associated with a FOV 105. The FOV 105 may refer to the observable area within which the second IR imaging device 104 may capture images (e.g., generate second IR image data). As described hereafter, in some embodiments, the second IR imaging device 104 may be positioned or oriented such that an emission source 10 is physically located within the FOV 105 of the second IR imaging device 104. Said differently, the FOV 105 of the second IR imaging device 104 may be such that second IR image data generated by the second IR imaging device 104 (e.g., captured IR images of the FOV 105) may include IR image data indicative of or otherwise associated with the emission source 10. The present disclosure contemplates that the second IR imaging device 104 may be positioned at any physical location and at any orientation based upon the intended application of the system 100. Furthermore, the present disclosure contemplates that the FOV 105 may be varied based upon the operating parameters of the second IR imaging device 104. As would be evident in light of the present disclosure, the first FOV 103 and the second FOV 105 may be different based upon the different positions of the respective first IR imaging device 102 and second IR imaging device 104. In other embodiments, the first FOV 103 and the second FOV 105 may at least partially overlap or coincide.

In some embodiments as described herein, the first IR imaging device 102 and the second IR imaging device 104 may be formed as an integral device or may be otherwise commonly housed, such as via housing 108 of a hyperspectral camera. In such an embodiment, the FOV 103 and the FOV 105 may, for example, at least partially overlap as described above. In other embodiments, the first IR imaging device 102 and the second IR imaging device 104 may be separately located. In any embodiment, the present disclosure contemplates that the FOV 103 and/or the FOV 105 may be dynamically adjusted (e.g., tilted, panned, pivoted, etc.) during performance of the operations described herein.

As described hereafter with reference to the operations of FIGS. 3-6, the imaging system 100 of the present disclosure may be positioned proximate an emission source 10 (e.g., a pipeline or any feature, vessel, container, etc. from which gas may leak) so as to detect and quantify a fugitive emission 20 emitted from the emission source 10 (e.g., following completion of the detection limit operations described herein). The positioning may be such that a distance exists between the emission source 10 and, by association, the fugitive emission 20. As would be evident in light of the relative position of the first IR imaging device 102 and the second IR imaging device 104, the first IR image data generated by the first IR imaging device 102 and the second IR image data generated by the second IR imaging device 104 may differ due to the different perspectives (e.g., FOVs 103, 105) of these devices 102, 104. As such, a first feature (e.g., geometric center, center of mass, etc.) or set of features (e.g., corners, edges, contours, etc.) for the fugitive emission 20 in the first IR image data may differ from a second feature (e.g., geometric center, center of mass, etc.) or set of features (e.g., corners, edges, contours, etc.) for the same fugitive emission 20 in the second IR image data. As described hereafter with reference to FIG. 6, the embodiments of the present disclosure may leverage multiple sources of IR image data (e.g., first IR imaging device 102, second IR imaging device 104, etc.) in order to provide a robust solution for thermal contrast and detection limit determinations. As such, any disparity between the feature(s) of the fugitive emission 20 in the first IR image data and the feature(s) of the fugitive emission 20 in the second IR image data may be determined, accounted for, or otherwise considered in order to ensure accurate thermal contrast and detection limit determinations.

The imaging system 100 may further include a temperature probe 110 that may be communicably coupled with the computing device 200 and, in some embodiments, communicably coupled with the first IR imaging device 102 and/or the second IR imaging device 104. The temperature probe 110 may be configured to generate probe temperature data indicative of the temperature proximate the temperature probe 110. By way of example, the temperature probe 110 may comprise a thermistor configured to generate probe temperature data indicative of the temperature (e.g., air temperature) proximate a probe, extension, etc. that is in fluid communication with the external environment of the imaging system 100 described herein. Although described herein with reference to a thermistor, the present disclosure contemplates that any temperature sensor, thermocouple, thermometer, etc. capable of determining temperature (e.g., generating probe temperature data) may be used by the temperature probe 110 without limitation. In some embodiments, the imaging system 100 comprises the temperature probe in that the temperature probe 100 is attached to, housed by, secured to, etc. a housing 108 supporting at least the first IR imaging device 102 (e.g., an integrated component embodiment). In other embodiments, the temperature probe 110 may be positioned within the field of view of the first IR imaging device 102 and/or proximate the emission source 10 as described hereafter.

With continued reference to FIG. 1, the imaging system 100 may include a computing device 200 that is connected with the first IR imaging device 102, the second IR imaging device 104, and/or the temperature probe 110 over a network 106. In some instances, the first IR imaging device 102 may comprise the computing device 200, in whole or in part. In some instances, the second IR imaging device 104 may comprise the computing device 200, in whole or in part. In other instances, the first IR imaging device 102, the second IR imaging device 104, and the computing device 200 may be formed as a single, integrated device. The computing device 200 may include circuitry, networked processors, or the like configured to perform some or all of the apparatus-based (e.g., IR image based) processes described herein and may be any suitable processing device and/or network server. In this regard, the computing device 200 may be embodied by any of a variety of devices. For example, the computing device 200 may be configured to receive/transmit data (e.g., IR image data, probe temperature data, etc.) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 106 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 106 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 106 may include a public network, such as the Internet, a private network, such as an intranet, or combinations thereof, and may utilize a variety of networking protocols now available or later developed including, but not limited to TCP/IP based networking protocols. In some embodiments, the network 106 may refer to a collection of wired connections such that the first IR imaging device 102, the second IR imaging device 104, temperature probe 110, and/or the computing device 200 may be physically connected, via one or more networking cables or the like.

Figure 2:
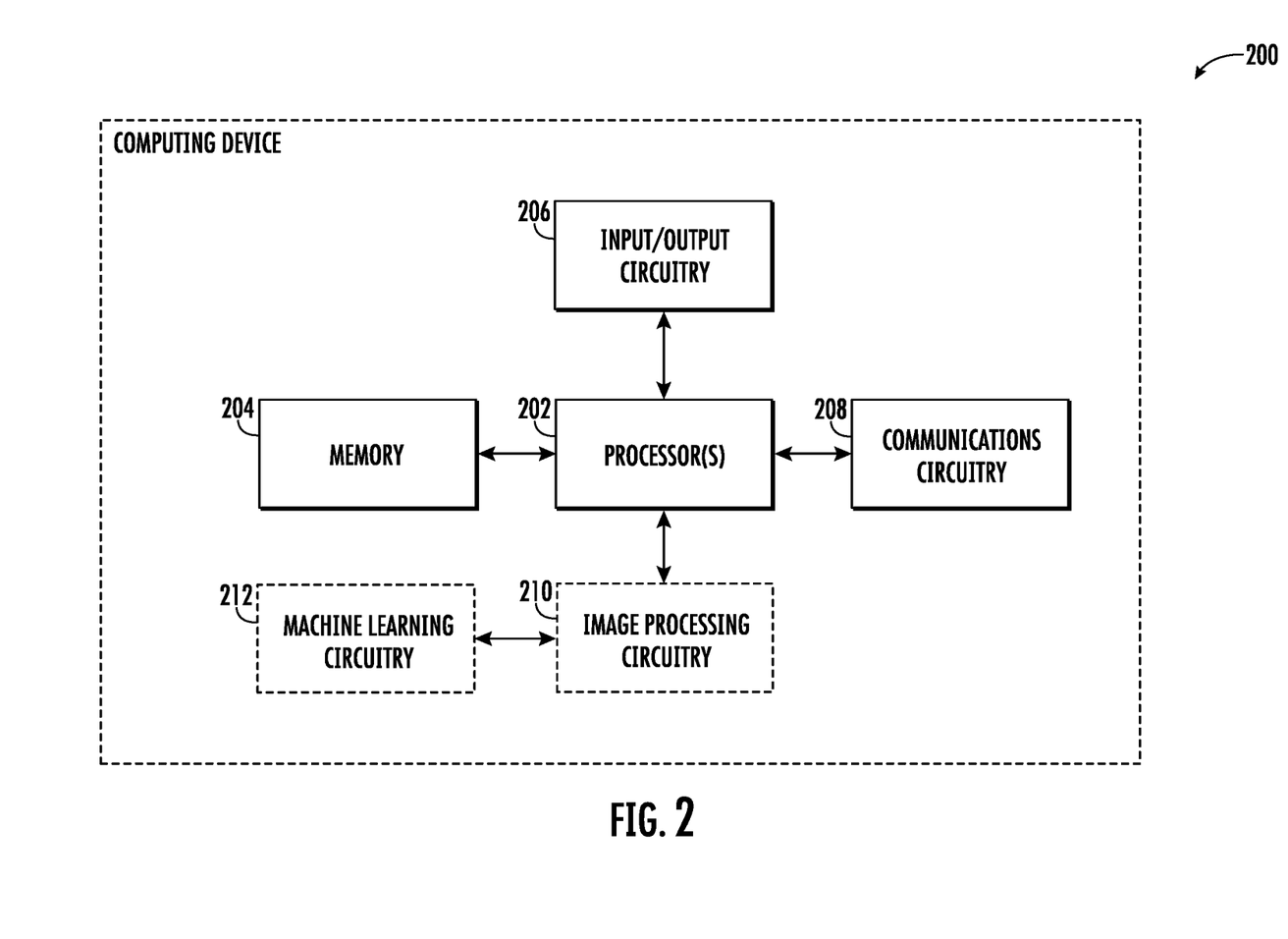
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, the computing device 200 may include image processing circuitry 210 and/or machine learning circuitry 212. The computing device 200 may be configured to execute the operations described below in connection with FIGS. 3-6. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within the first IR imaging device 102, the second IR imaging device 104, and/or the temperature probe 110. It will be understood in this regard that some of the components described in connection with the computing device 200 may be housed within one or more of the devices of FIG. 1, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The image processing circuitry 210 includes hardware components designed to analyze the first IR image data and/or second IR image data so as to determine or generate background temperature data associated with each pixel within the first IR image data and/or second IR image data. The image processing circuitry 210 may further determine a thermal contrast for each pixel based upon a comparison between the background temperature data and the gas temperature data and a detection limit for each pixel as a function of the determined thermal contrast. Image processing circuitry 210 may utilize processing circuitry, such as the processor 202, to perform its corresponding operations, and may utilize memory 204 to store collected information. In some instances, the image processing circuitry 210 may further include machine learning circuitry 212 that includes hardware components designed to leverage artificial intelligence, supervised learning, unsupervised learning, etc. to analyze IR image data so as to iteratively determine the thermal contrast and detection limit associated with the imaging system. By way of example, machine learning circuitry 212 may comprise or leverage an artificial neural network or convolutional neural network trained on at least a plurality of captured IR image data associated with gas leaks or plumes and/or user confirmation to improve subsequent operation of the operations described herein. The machine learning circuitry 212 may also utilize processing circuitry, such as the processor 202, to perform its corresponding operations, and may utilize memory 204 to store collected information.

It should also be appreciated that, in some embodiments, the image processing circuitry 210 and/or the machine learning circuitry 212 may include a separate processor, specially configured field programmable gate array (FPGA), or application specific interface circuit (ASIC) to perform its corresponding functions. In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present disclosure may be configured as apparatuses, systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Detection Limit Determinations

Figure 3:
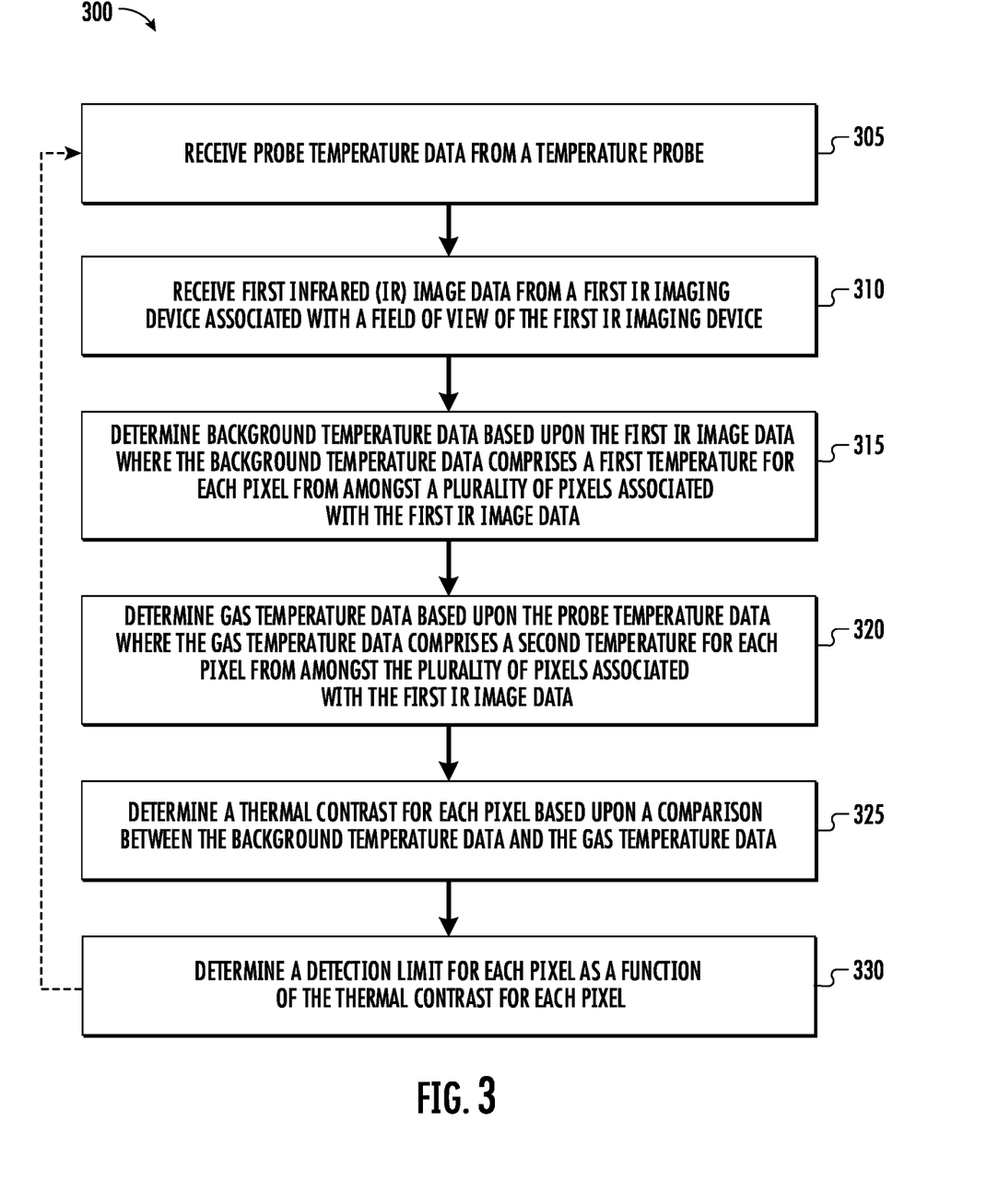
FIG. 3 illustrates an example flowchart for detection limit determinations, in accordance with some example embodiments described herein.

FIG. 3 illustrates a flowchart containing a series of operations for example detection limit determinations. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 305, the apparatus (e.g., computing device 200) includes means, such as processor 202, communications circuitry 208, image processing circuitry 210, or the like, for receiving probe temperature data from a temperature probe 110, wherein the probe temperature data is indicative of an external environment of the imaging system 100. As described above, the computing device 200 may be communicably coupled with the temperature probe 110 so as to receive probe temperature data in response to operation of the temperature probe 110. In some embodiments, the temperature probe 110 may be attached to a housing 108 supporting the first IR imaging device 102 such that the probe temperature data received at operation 305 refers data entries indicative of the air temperature proximate, surrounding, or otherwise near the housing 108. In other embodiments, the temperature probe 110 may be separate from the first IR imaging device 102 such that the probe temperature data received at operation 305 is indicative of the air temperature proximate, surrounding, or otherwise near the relative position of the temperature probe 110.

In some still further embodiments, the temperature probe 110 may be positioned within the FOV 103 of the first IR imaging device 102 and/or proximate the emission source 10. As would be evident in light of the present disclosure, the distance between the temperature probe 110 and the location at which any gas leak or fugitive emission 20 may occur may operate to impact the applicability of the probe temperature data. Given that the location of an emission source 10 may be unknown, however, the temperature probe 110 may be positioned at locations at which fugitive emissions 20 are more likely to occur (e.g., conduit interfaces, valves, locations of prior leaks or emission events, etc.). Although illustrated with a single temperature probe 110 in FIG. 1, the present disclosure contemplates that the imaging system 100 may include a plurality of temperature probes 110 at the same location or differing locations so as to generate probe temperature data from a plurality of locations, for example, within the FOV 103.

As shown in operation 310, the apparatus (e.g., computing device 200) includes means, such as processor 202, communications circuitry 208, image processing circuitry 210, or the like, for receiving first infrared (IR) image data from a first IR imaging device 102 associated with a field of view 103 of the first IR imaging device 102. The first IR image data generated by the first IR imaging device 102 may include a plurality of data entries, one or more of which may be associated with particular pixels that represent the FOV 103 of the first IR imaging device 102. As shown in FIG. 1, the first IR image data may include one or more data entries associated with the emission source 10 so as to include a background that may exist during an emission event (e.g., the presence of a fugitive emission 20). Said differently, the first IR image data received at operation 310 may refer to IR image data generated by the first IR imaging device 102 in the absence of a fugitive emission 20. For example, the first IR image data may be indicative of the intensity of the IR radiation received by the first IR imaging device 102 for each pixel captured for the FOV 103, including those associated with a background of a potential emission source 10. As would be evident in light of the present disclosure, the first IR image data may occur (e.g., be generated) in the absence of a fugitive emission 20 so as to determine a background temperature that is unaffected by a temperature associated with such a potential fugitive emission 20. To this end, the imaging system 100 may employ various image processing techniques to determine that the FOV 103 lacks a fugitive emission 20 at the time at which the first IR image data is generated.

In embodiments in which the computing device 200 and the first IR imaging device 102 are contained within a common device or integrated device (e.g., the computing device 200 comprises the first IR imaging device 102), the first IR image data may be received by the computing device 200 as part of normal operation of the first IR imaging device 102 (e.g., an internal transmission, if any). In other embodiments in which the computing device 200 is located separate from the first IR imaging device 102, such as connected via network 106, the computing device 200 may be configured to receive the first IR image data from the first IR imaging device 102 in response to generation of the first IR image data. Said differently, each instance of first IR image data generation may be transmitted to the computing device 200 upon generation. In other embodiments, the computing device 200 may periodically (e.g., according to a defined rate or sampling protocol) request first IR image data from the first IR imaging device 102.

As shown in operation 315, the apparatus (e.g., computing device 200) includes means, such as processor 202, communications circuitry 208, image processing circuitry 210, or the like, for determining or generating background temperature data based upon the first IR image data. The background temperature data may include a first temperature for each pixel from amongst a plurality of pixels associated with the first IR image data. As described above, the first IR image data may include data entries indicative of the intensity of the IR radiation received by the first IR image device 102 for a plurality of pixels representing the FOV 103 such that this intensity may be used to determine an associated temperature (e.g., first temperature) for each pixel from amongst a plurality of pixels associated with the first IR image data. As would be evident in light of the present disclosure, the first IR image data received at operation 310 may refer to a hyperspectral image cube in which a given x/y location or position in a traditional red/blue/green (rgb) visual camera also includes various IR radiation values (e.g., lambda 1, lambda 1, etc.) indicative of the intensity of the IR radiation received by the first IR imaging device 102 for each pixel captured for the FOV 103. In some embodiments, the first temperature for each pixel may refer to a numerical temperature value, a range of numerical temperature values, or the like.

Thereafter, as shown in operation 320, the apparatus (e.g., computing device 200) includes means, such as processor 202, communications circuitry 208, image processing circuitry 210, machine learning circuitry 212, or the like, for determining gas temperature data based upon the probe temperature data. The gas temperature data may include a second temperature for each pixel from amongst the plurality of pixels associated with the first IR image data. As described above, the temperature probe 110 may generate probe temperature data indicative of an external environment of the imaging system 100. Furthermore, although an emission event (e.g., gas leak) may result in an increased temperature at the initial emission of the gas, due to applicable time limitations, the temperature of the gas leak (e.g., emission event) may reach or otherwise substantially match the temperature of the external environment. As such, the embodiments of the present disclosure may set an example gas temperature (e.g., the temperature associated with a potential fugitive emission 20) as the temperature of the external environment as provide by the probe temperature data.

In some embodiments, the second temperature for each pixel from amongst the plurality of pixels associated with the first IR image data may be assigned the same temperature value or range of temperature values as provided by the temperature probe 110. In embodiments in which a plurality of temperature probes 110 may be used as described above, the computing device 200 may determine gas temperature data at operation 320 by selectively associating probe temperature data with pixels from amongst the first IR image data. For example, the computing device 200 may, via imaging processing, user input, etc. receive data entries indicative of the relative location of the temperature probe(s) 110 within the FOV 103. As such, the computing device 200 may determine the relative distance between a particular pixel and the plurality of temperature probes 110 and assign the second temperature value for the particular pixel as the temperature value defined by the probe temperature data generated by the temperature probe 110 that is the closest in physical position to the particular pixel.

Thereafter, as shown in operation 325, the apparatus (e.g., computing device 200) includes means, such as processor 202, communications circuitry 208, image processing circuitry 210, machine learning circuitry 212, or the like, for determining a thermal contrast for each pixel based upon a comparison between the background temperature data and the gas temperature data. As described above, the background temperature data may include a first temperature value for each pixel from amongst the plurality of pixels associated with the first IR image data. Similarly, the gas temperature data may include a second temperature value for each pixel from amongst the plurality of pixels associated with the first IR image data as informed by the probe temperature data. Therefore, in some embodiments, the determination of the thermal contrast at operation 325 may refer to the mathematical difference on a pixel-by-pixel basis between the background temperature and the gas temperature (e.g., a mathematical difference between the first temperature value and the second temperature value for each pixel). As would be evident by the present disclosure, a positive thermal contrast value may refer to an instance in which a fugitive gas 20 would absorb energy (e.g., heat), while a negative thermal contrast value may refer to an instance in which a fugitive gas 20 would emit energy (e.g., heat). As such, in some embodiments, the thermal contrast value for each pixel may refer to the absolute value of the mathematical difference between the first temperature value and the second temperature value for each pixel.

Thereafter, as shown in operation 330, the apparatus (e.g., computing device 200) includes means, such as processor 202, communications circuitry 208, image processing circuitry 210, machine learning circuitry 212, or the like, for determining a detection limit for each pixel as a function of the thermal contrast for each pixel. The detection limit for each pixel may operate to indicate to a user the ability of the imaging system 100 to properly detect and/or quantify a fugitive emission 20 at a particular location (e.g., at particular pixels). For example, as the thermal contrast increases, the ability to detect a fugitive emission 20 may be diminished and or the ability to quantify the size, intensity, amount, etc. of the fugitive emission may be reduced. By way of a particular example, a relatively larger thermal contrast value may be present for a pixel associated with a background location aligned with a furnace or other heat source while a relatively smaller thermal contrast value may be present for a pixel associated with a background location aligned with a cooling or relatively cooler location. In such an example, the ability for the IR imaging system 100 to quantify a fugitive emission 20 aligned with the example heat source may be reduced relative the ability for the IR imaging system 100 to quantify a fugitive emission 20 aligned with the cooler location. Such a detection limit may be provided to a user, in the form of a detection limit map or the like as described hereafter, so as to indicate to the user the detection capabilities of the imaging system 110 with respect to particular pixels (e.g., particular locations).

As would be evident in light of the present disclosure, the first IR image data received by the computing device 200 may refer to a hyperspectral image cube in which a given x/y location or position in a traditional red/blue/green (rgb) visual camera also includes various IR radiation values (e.g., lambda 1, lambda 1, etc.) indicative of the intensity of the IR radiation received by the first IR imaging device 102 for each pixel captured for the FOV 103. In order to determine the detection limit as described herein, the computing device 200 may leverage one or more radiative transfer models. Radiative transfer may refer to the energy transfer in the form of electromagnetic radiation that propagates through an environment and is affected by absorption, emission, and/or scattering. As would be evident in light of the present disclosure, the spectral absorption data may refer to the spectrum of absorption lines, bands, etc. that may result from the radiation (e.g., light) produced by a heated source (e.g., having a temperature differential with an ambient environment of the source. The source (e.g., fugitive emission 20) that produces a continuous spectrum passes through a relatively cooler gas, and the associated absorption spectrum is indicative of the fraction of incident electromagnetic radiation absorbed by the material over a range of frequencies. Such a spectrum as associated with the spectral absorption data, may be used as described in operation 330 to determine a detection limit for a particular pixel as a function of the example radiative transfer model. Said differently, a function exists for the example radiative transfer model that may be represented as path concentration as a function of thermal contrast.

Figure 4:
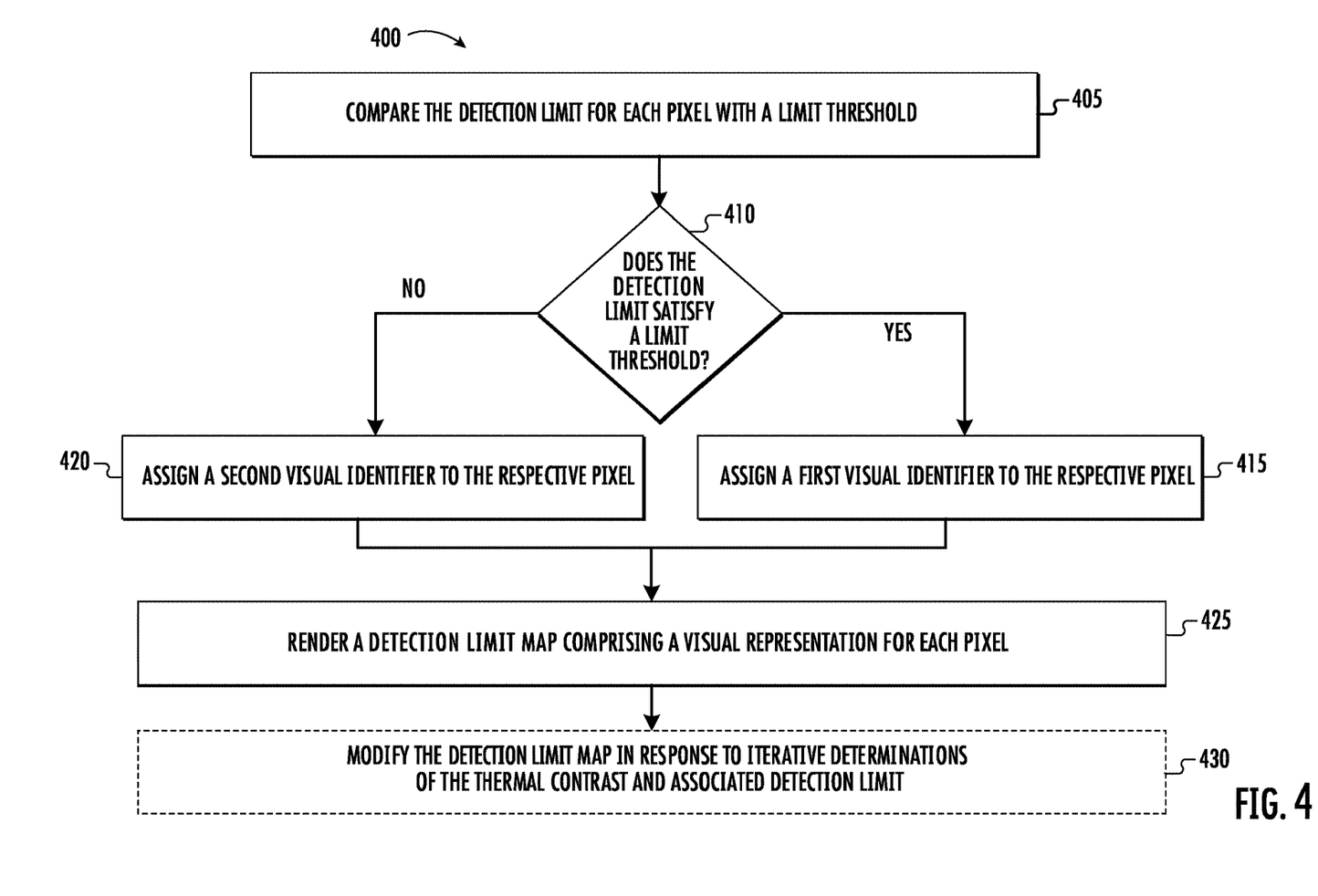
FIG. 4 illustrates an example flowchart for visual identifier determinations, in accordance with some example embodiments described herein.

FIG. 4 illustrates a flowchart containing a series of operations for visual identifier determinations. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operations 405 and 410, the apparatus (e.g., computing device 200) includes means, such as processor 202, communications circuitry 208, image processing circuitry 210, or the like, for comparing the detection limit for each pixel with a limit threshold. By way of example, the computing device 200 may leverage one or more threshold values for the detection limit against which the detection limit for each pixel may be compared. The limit threshold may refer to any metric, gauge, or the like at which, for example, the computing device 200 may determine that the ability for the imaging system 100 to quantify a potential fugitive emission 20 is increased or diminished. In some embodiments, satisfying the limit threshold at operations 405, 410 may refer to a detection limit value for a particular pixel that exceeds the value associated or defined by the limit threshold. The present disclosure contemplates that the limit threshold may be, in some embodiments, determined or assigned by a system administrator or user associated with the imaging system 100. Additionally or alternatively, the limit threshold may be determined by the imaging system 100, such as via iterative performance of the operations of FIG. 3.

In an instance in which the detection limit satisfies the limit threshold, as shown in operation 415, the apparatus (e.g., computing device 200) includes means, such as processor 202, communications circuitry 208, image processing circuitry 210, or the like, for assigning a first visual identifier to the respective pixel. By way of example, the first visual identifier may refer to a particular color, pattern, shape, etc. that may, when viewed by a user, indicate to the user that the particular pixel is grouped with other pixels having the first visual identifier. In other words, the first visual identifier may be the same for each pixel having a detection limit that satisfies the limit threshold at operations 405, 410 (e.g., a common first color). In an instance in which the detection limit fails to satisfy the limit threshold, as shown in operation 420, the apparatus (e.g., computing device 200) includes means, such as processor 202, communications circuitry 208, image processing circuitry 210, or the like, for assigning a second visual identifier to the respective pixel. By way of example, the second visual identifier may refer to a particular color, pattern, shape, etc. that may, when viewed by a user, indicate to the user that the particular pixel is grouped with other pixels having the second visual identifier (e.g., and may be different from the first visual identifier). In other words, the second visual identifier may be the same for each pixel having a detection limit that fails to satisfy the limit threshold at operations 405, 410 (e.g., a common second color).

Figure 5:
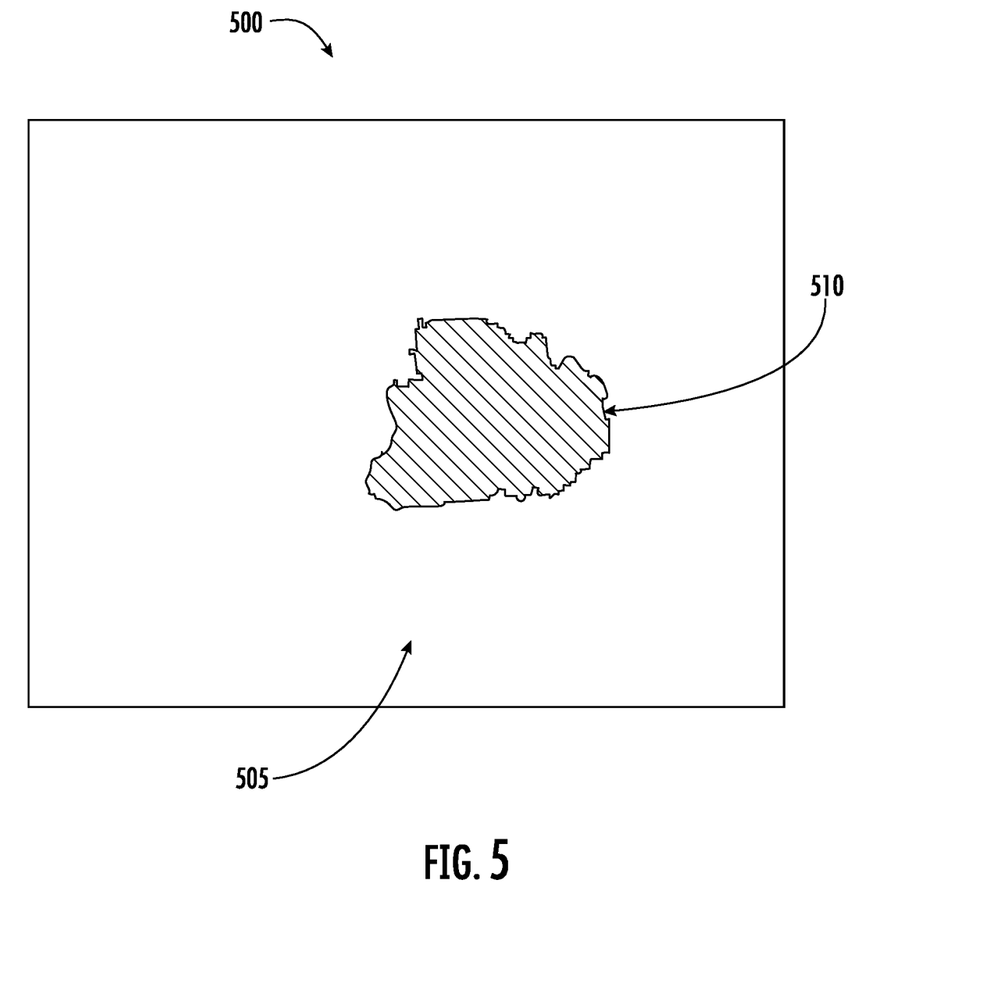
FIG. 5 illustrates an example detection limit map, in accordance with some example embodiments described herein.

Thereafter, as shown in operation 425, the apparatus (e.g., computing device 200) includes means, such as processor 202, communications circuitry 208, image processing circuitry 210, or the like, for rendering a detection limit map comprising a visual representation for each pixel based upon the visual identifier assigned to the respective pixel, such as the example detection limit map illustrated in FIG. 5. By way of example, the imaging system 110 may include or otherwise be communicably coupled with a display screen such that the computing device 200 may generate instructions for rendering a visual representation of each of the pixels associated with the first IR image data with an associated visual identifier. As shown in FIG. 5, for example, the first visual identifier 505 that is assigned to pixels having a detection limit that satisfies the limit threshold may be a first color or first pattern. Similarly, as shown in FIG. 5, the second visual identifier 510 that is assigned to pixels having a detection limit that fails to satisfy the limit threshold may be a second color or second pattern. Although described and illustrated with respect to two (e.g., a first and a second) visual identifier, the present disclosure contemplates that the detection limit map may utilize any number of visual identifiers associated with the same pixels, groupings or pixels, subgroupings of pixels, and/or the like based upon the intended application of the imaging system 100. Furthermore, the present application contemplates that a user associated with the imaging system 100 may interact with the detection limit map, such as by selecting particular pixels or groups of pixels for further analysis, consideration, iterative operation of the operations of FIGS. 3-4, and/or the like.

In some embodiments, as shown in operation 430, the apparatus (e.g., computing device 200) includes means, such as processor 202, communications circuitry 208, image processing circuitry 210, or the like, for modifying the detection limit map in response to iterative determinations of the thermal contrast and the associated detection limit. As would be evident in light of the present disclosure, the thermal contrast and detection limit determinations of FIG. 3 may be iteratively performed. For example, the computing device 200 may iteratively receive probe temperature data and/or first IR image data and iteratively determine or generate the thermal contrast for one or more pixels associated with the first IR image data and subsequently detection associated detection limits as a function of these thermal contrast values. As such, the operations of FIG. 4 may also be iteratively performed so as to modify the detection limit map to accurately reflect any changes in detection limit. In some embodiments, a subsequent performance of the operations of FIG. 3 may occur in response to a user request (e.g., a refresh request) that results in a refresh of the detection limit map based upon a subsequent comparison of detection limit values with the limit threshold. For example, a user may specify a limit threshold as described above that is important to the application of the imaging system, user, etc. The computing device 200 may determine the minimum detection required of path concentration as defined above to enable sufficient signal for the imaging device to generate an alert in an instance in which a fugitive emission is present. For example, a 2-3 degrees Celsius contrast may be used in some applications of the imaging system 100.

Figure 6:
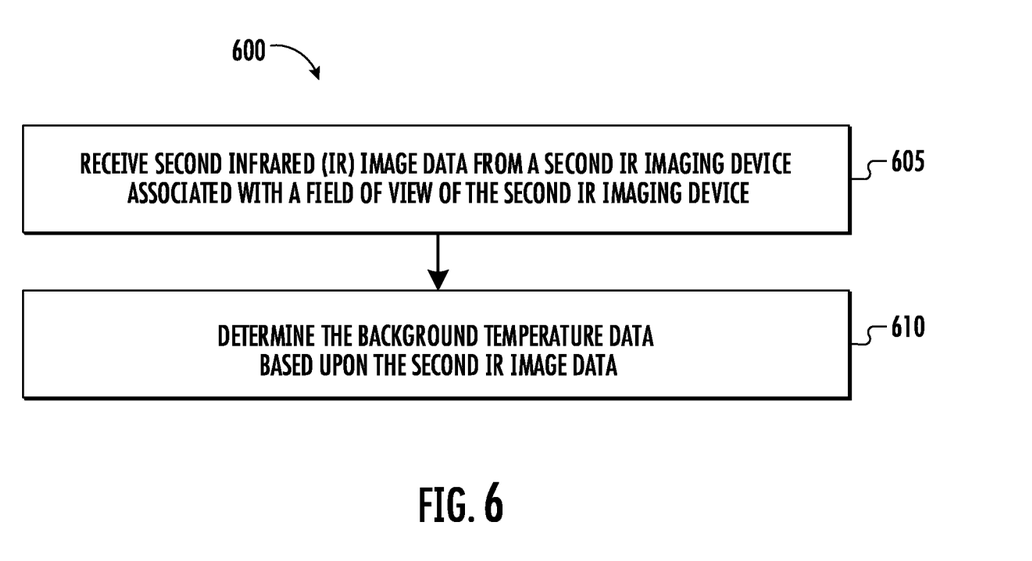
FIG. 6 illustrates an example flowchart for multiple imaging device implementations, in accordance with some example embodiments described herein

FIG. 6 illustrates a flowchart containing a series of operations for multiple device implementations. The operations illustrated in FIG. 5 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 605, the apparatus (e.g., computing device 200) includes means, such as processor 202, communications circuitry 208, image processing circuitry 210, or the like, for receiving second infrared (IR) image data from a second IR imaging device 104 associated with a field of view 105 of the second IR imaging device 104. Similar to operation 305, the second IR image data generated by the second IR imaging device 104 may include a plurality of data entries, one or more of which may be associated with particular pixels that represent the FOV 105 of the second IR imaging device 104. As shown in FIG. 1, the second IR image data may include one or more data entries associated with or otherwise indicative of a potential emission source 10. For example, the second IR image data may also be indicative of the intensity of the IR radiation received by the second IR imaging device 104 for each pixel captured for the FOV 105. In embodiments in which the computing device 200 and the second IR imaging device 104 are contained within a common device or integrated device (e.g., the computing device 200 comprises the second IR imaging device 104), the second IR image data may be received by the computing device 200 as part of normal operation of the second IR imaging device 104 (e.g., an internal transmission, if any). In other embodiments in which the computing device 200 is located separate from the second IR imaging device 104, such as connected via network 106, the computing device 200 may be configured to receive the second IR image data from the second IR imaging device 104 in response to generation of the second IR image data. Said differently, each instance of second IR image data generation may be transmitted to the computing device 200 upon generation. In other embodiments, the computing device 200 may periodically (e.g., according to a defined rate or sampling protocol) request second IR image data from the second IR imaging device 104.

As shown in operation 610, the apparatus (e.g., computing device 200) includes means, such as processor 202, communications circuitry 208, image processing circuitry 210, or the like, for determining the background temperature data based upon the second IR image data. As would be evident in light of the relative positioning between the first IR imaging device 102 and the second IR imaging device 104, one or more pixels associated with the first IR image data may be similarly associated with the second IR image data. In order to provide additional data sources so as to improve the determination regarding the thermal contrast and detection limit, the system 100 may leverage background temperature based upon the second IR image data in conjunction with the background image data based upon the first IR image data. As such the computing device 200 may operate to refine thermal contrast and detection limit determinations based upon an increased dataset (e.g., a higher confidence output). Although described herein with reference to a second IR imaging device 104 and associated second IR image data, the present disclosure contemplates that data inputs from a variety of additional sources including additional broadband IR image data, visual image data (e.g., VIS and/or rgb data), and/or the like may be used to further improved upon the operations described above with reference to FIGS. 3-4 and 6.

FIGS. 3-4 and 6 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200.

As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

The invention claimed is:

1. An imaging system comprising:
a first infrared (IR) imaging device configured to generate first IR image data of a field of view of the first IR imaging device; and
a computing device operably connected with the first IR imaging device, wherein the computing device is configured to:
receive probe temperature data from a temperature probe communicably coupled with the computing device, wherein the probe temperature data is indicative of an external environment of the imaging system;
receive the first IR image data from the first IR imaging device;
determine background temperature data based upon the first IR image data, wherein the background temperature data comprises a first temperature for each pixel from amongst a plurality of pixels associated with the first IR image data;
determine gas temperature data based upon the probe temperature data, wherein the gas temperature data comprises a second temperature for each pixel from amongst the plurality of pixels associated with the first IR image data;
determine a thermal contrast for each pixel based upon a comparison between the background temperature data and the gas temperature data; and
determine a detection limit for each pixel as a function of the thermal contrast for each pixel and based on a radiative transfer model.

2. The imaging system according to claim 1, wherein the temperature probe is positioned within the field of view of the first IR imaging device.

3. The imaging system according to claim 1, wherein the imaging system comprises the temperature probe and the temperature probe is attached to a housing supporting the first IR imaging device.

4. The imaging system according to claim 1, further comprising a second IR imaging device configured to generate second IR image data of a field of view of the second IR imaging device and operably connected with the computing device, wherein the computing device is further configured to determine the background temperature data based upon the second IR image data.

5. The imaging system according to claim 1, wherein the computing device is further configured to:
compare the detection limit for each pixel with a limit threshold;
in an instance in which the detection limit satisfies the limit threshold, assign a first visual identifier to the respective pixel; and
in an instance in which the detection limit fails to satisfy the limit threshold, assign a second visual identifier to the respective pixel.

6. The imaging system according to claim 5, wherein the computing device is further configured to render a detection limit map comprising a visual representation for each pixel based upon the visual identifier assigned to the respective pixel.

7. The imaging system according to claim 6, wherein the computing device is further configured to modify the detection limit map in response to iterative determinations of the thermal contrast and associated detection limit.

8. A computer-implemented method comprising:
receiving probe temperature data from a temperature probe, wherein the probe temperature data is indicative of an external environment of an imaging system;
receiving first infrared (IR) image data from a first IR imaging device of a field of view of the first IR imaging device;
determining background temperature data based upon the first IR image data, wherein the background temperature data comprises a first temperature for each pixel from amongst a plurality of pixels associated with the first IR image data;
determining gas temperature data based upon the probe temperature data, wherein the gas temperature data comprises a second temperature for each pixel from amongst the plurality of pixels associated with the first IR image data;
determining a thermal contrast for each pixel based upon a comparison between the background temperature data and the gas temperature data; and
determining a detection limit for each pixel as a function of the thermal contrast for each pixel and based on a radiative transfer model.

9. The computer-implemented method according to claim 8, wherein the temperature probe is positioned within the field of view of the first IR imaging device.

10. The computer-implemented method according to claim 8, further comprising:
receiving second IR image data from a second IR imaging device of a field of view of the second IR imaging device; and
determining the background temperature data based upon the second IR image data.

11. The computer-implemented method according to claim 8, further comprising:
comparing the detection limit for each pixel with a limit threshold;
in an instance in which the detection limit satisfies the limit threshold, assigning a first visual identifier to the respective pixel; and
in an instance in which the detection limit fails to satisfy the limit threshold, assigning a second visual identifier to the respective pixel.

12. The computer-implemented method according to claim 11, further comprising rendering a detection limit map comprising a visual representation for each pixel based upon the visual identifier assigned to the respective pixel.

13. The computer-implemented method according to claim 12, further comprising modifying the detection limit map in response to iterative determinations of the thermal contrast and associated detection limit.

14. The computer-implemented method according to claim 8, wherein the temperature probe is attached to a housing supporting the first IR imaging device.

15. A computer program product comprising at least one non-transitory computer-readable storage medium having computer program code thereon that, in execution with at least one processor, configures the computer program product for:

receiving probe temperature data from a temperature probe, wherein the probe temperature data is indicative of an external environment of an imaging system;

receiving first infrared (IR) image data from a first IR imaging device of a field of view of the first IR imaging device;

determining background temperature data based upon the first IR image data, wherein the background temperature data comprises a first temperature for each pixel from amongst a plurality of pixels associated with the first IR image data;

determining gas temperature data based upon the probe temperature data, wherein the gas temperature data comprises a second temperature for each pixel from amongst the plurality of pixels associated with the first IR image data;

determining a thermal contrast for each pixel based upon a comparison between the background temperature data and the gas temperature data; and determining a detection limit for each pixel as a function of the thermal contrast for each pixel and based on a radiative transfer model.

16. The computer program product according to claim 15, further configured for:

receiving second IR image data from a second IR imaging device of a field of view of the second IR imaging device; and determining the background temperature data based upon the second IR image data.

17. The computer program product according to claim 15, further configured for:

comparing the detection limit for each pixel with a limit threshold;

in an instance in which the detection limit satisfies the limit threshold, assigning a first visual identifier to the respective pixel; and in an instance in which the detection limit fails to satisfy the limit threshold, assigning a second visual identifier to the respective pixel.

18. The computer program product according to claim 17, further configure for rendering a detection limit map comprising a visual representation for each pixel based upon the visual identifier assigned to the respective pixel.

19. The computer program product according to claim 18, further configured for modifying the detection limit map in response to iterative determinations of the thermal contrast and associated detection limit.

20. The computer program product according to claim 15, wherein the temperature probe is attached to a housing supporting the first IR imaging device.

* * * * *